No. 644,577. Patented Mar. 6, 1900.
H. BUNGENSTOCK.
SHORTHAND NOTE BOOK.
(Application filed Mar. 14, 1899.)
(No Model.)
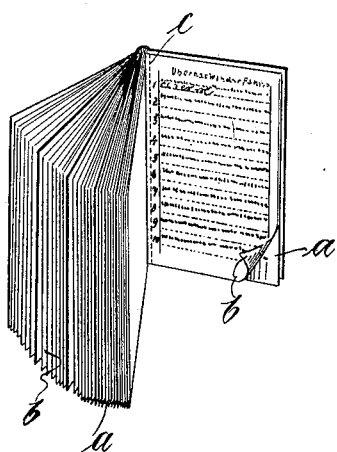
Witnesses:
Max Millenet
Hans Brauer
Inventor:
H. Bungenstock
by Gessner Mott
Attorney

UNITED STATES PATENT OFFICE.

HERMANN BUNGENSTOCK, OF HANOVER, GERMANY.

SHORTHAND NOTE-BOOK.

SPECIFICATION forming part of Letters Patent No. 644,577, dated March 6, 1900.

Application filed March 14, 1899. Serial No. 709,111. (No model.)

*To all whom it may concern:*

Be it known that I, HERMANN BUNGENSTOCK, teacher, a subject of the King of Prussia, German Emperor, residing at $8^D$ alte Bischofshalerstrasse, Hanover, Kingdom of Prussia, Germany, have invented new and useful Improvements in Shorthand Exercise-Books, of which the following is a specification.

In learning shorthand it is disagreeably felt that the pupil in writing his exercises has to transcribe the text on the left-hand side into shorthand on the right-hand side, and although it has previously been suggested to enable transcription of short or long hand text or translations of foreign languages or the like on the same side by providing slots or apertures in the sheet beneath the text to be transcribed or translated and placing such sheets over the paper to be written on, yet such an arrangement entails certain drawbacks—as, for instance, the loose sheets are likely to be torn in handling, owing to the presence of the slots or apertures, as the hand in resting on the sheet when writing through the slots is likely to catch the underlying bars and either mutilate or tear them from the sheet altogether. Even the use of blotting or similar paper placed over the sheet as a rest for the hand or fingers does not overcome this disadvantage, the rest requiring to be continually shifted as the transcription advances, so that the chance of mutilating the bars of the sheet is not decreased.

The present invention has for its purpose to overcome these disadvantages and to produce a shorthand exercise-book simple and effective in its arrangement which permits transcription of the longhand text into shorthand directly beneath the former, to enable manifold transcription of such text being a further purpose. The present invention, further, is to enable the separation of the shorthand transcription from the longhand text-book by tearing out the respective sheet.

With these ends in view the invention consists in the novel combination and arrangement of the printed longhand text in connection with the transparent sheets for transcription, as will be more fully set forth hereinafter and pointed out in the appended claim.

A shorthand exercise-book arranged according to the present invention is shown in the accompanying drawing, in which the figure is a plan.

The exercise-book, consisting in the customary manner of a right and left hand page, is fitted between each two pages $a$ $a'$, containing the text to be transcribed into shorthand, with a number of transparent leaves $b$. In the case illustrated six of these leaves are shown, these leaves being provided with a line of perforations $c$ near the inner margin. Supposing the longhand text on page $a$ has to be transcribed into shorthand, five of the transparent leaves $b$ are turned over, so that only one transparent leaf $b$ remains resting on page $a$. This enables a transcription of the longhand text on page $a$, which is visible through the transparent leaf $b$, onto the latter in shorthand. After the transcription is finished the respective leaf $b$ may be torn out of the book, so that the remaining five leaves can be used successively.

The torn-out leaves $b$ may be employed for reading exercise.

It may be advantageous to provide the transparent leaves $b$ with numbers corresponding to the number of the page $a$ which they cover.

Having now described and ascertained the nature of my invention, what I claim as new, and desire to secure by Letters Patent, is—

In a shorthand exercise-book having between its ordinary leaves bearing the longhand text a number of separable transparent sheets for transcription purposes, said ordinary leaves being provided with a blank space between each line of longhand text to permit transcription of the latter beneath the line on a transparent sheet, substantially as described and shown and for the purpose mentioned.

In testimony whereof I have hereunto set my hand in presence of two subscribing witnesses.

HERMANN BUNGENSTOCK.

Witnesses:
 KIRKE LATHROP,
 W. K. ANDERSON.